March 6, 1951  B. W. HANCOCK ET AL  2,544,082
FILM SPLICING MACHINE
Filed Aug. 11, 1947  4 Sheets-Sheet 1

Inventor
Benjamin W. Hancock
Joseph B. Maier
By Lyon & Lyon Attorneys

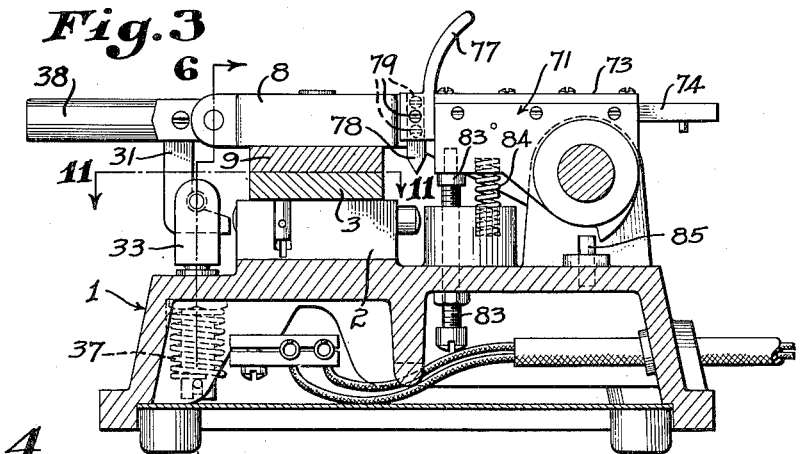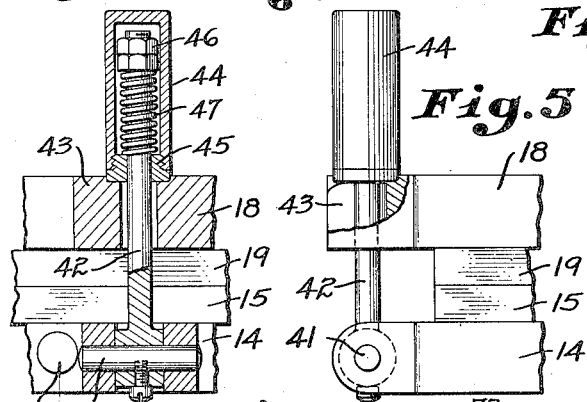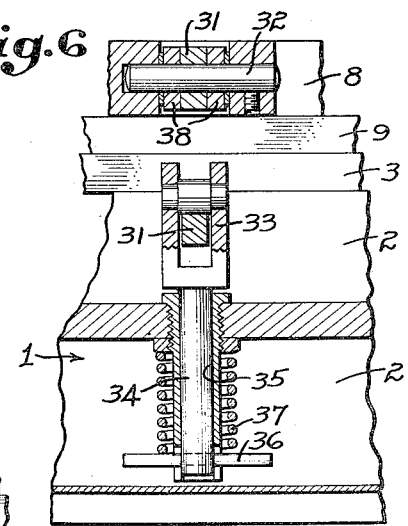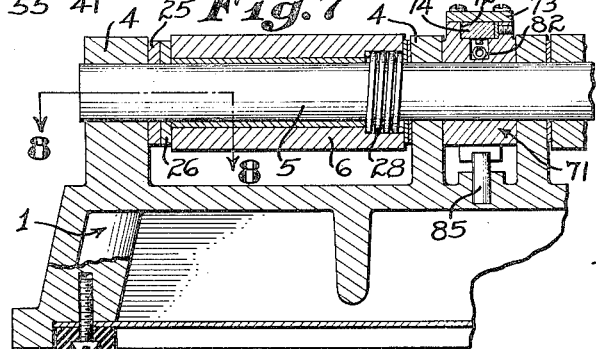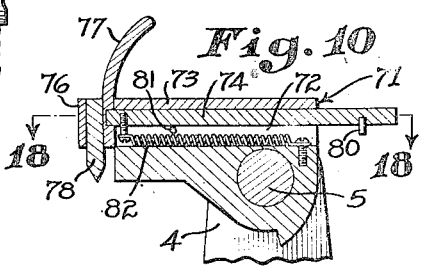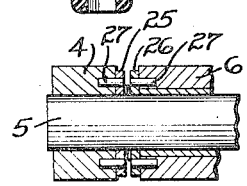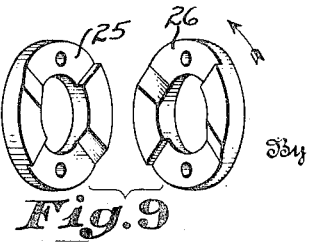

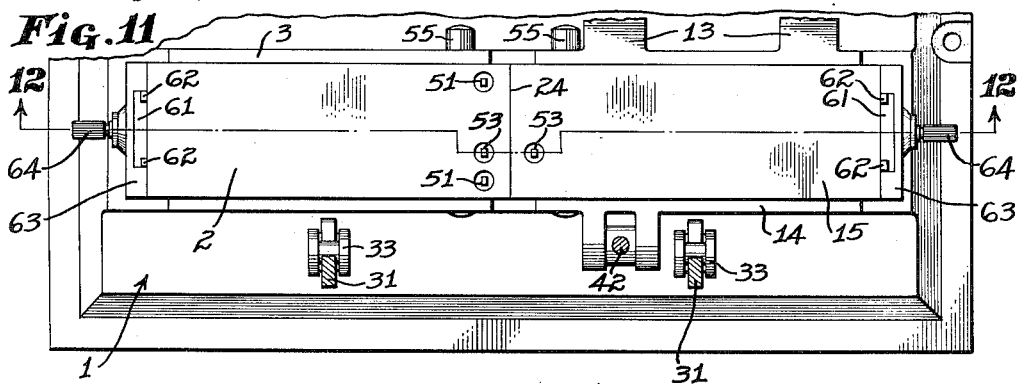
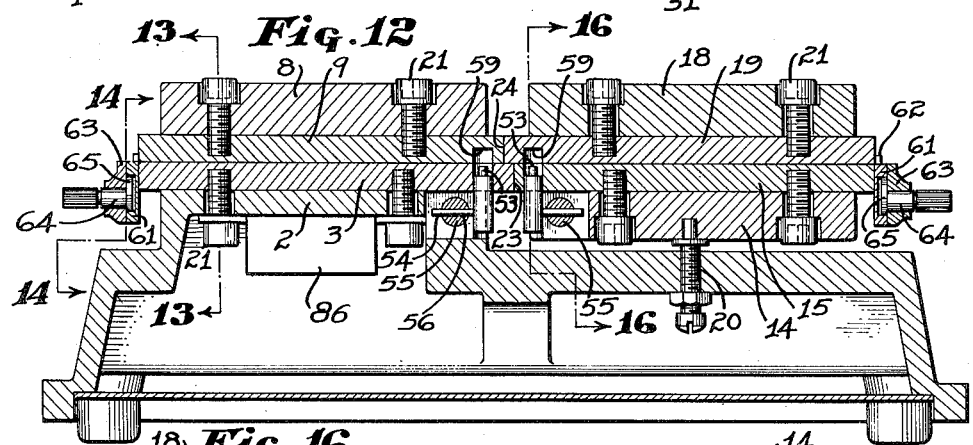
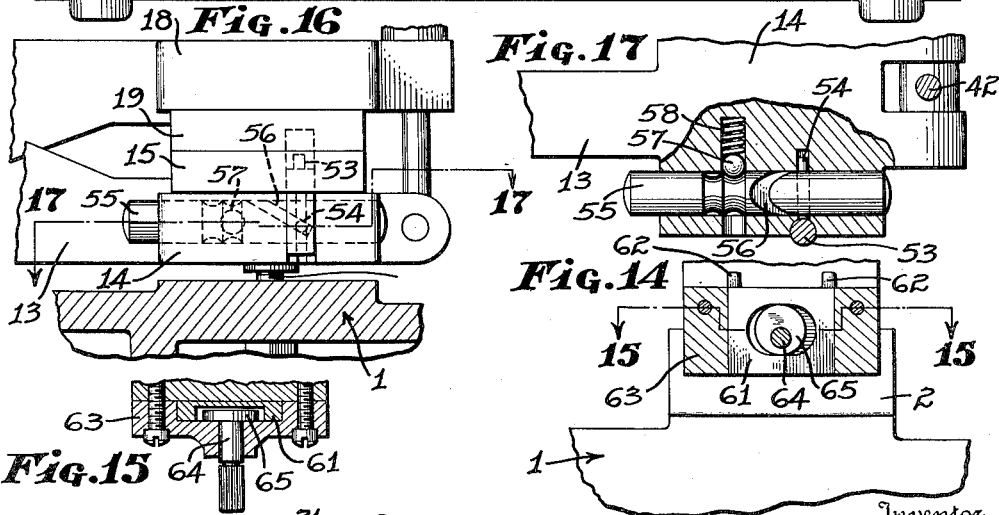

March 6, 1951  B. W. HANCOCK ET AL  2,544,082
FILM SPLICING MACHINE
Filed Aug. 11, 1947  4 Sheets-Sheet 4
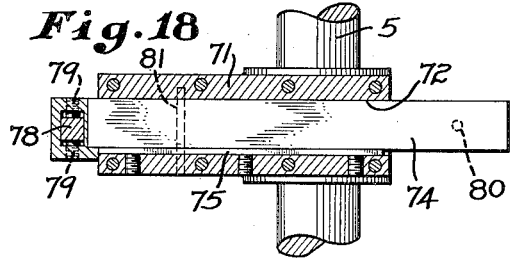
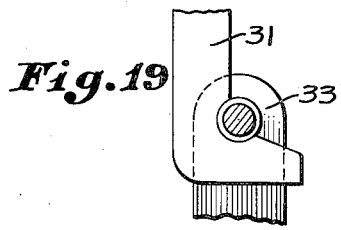
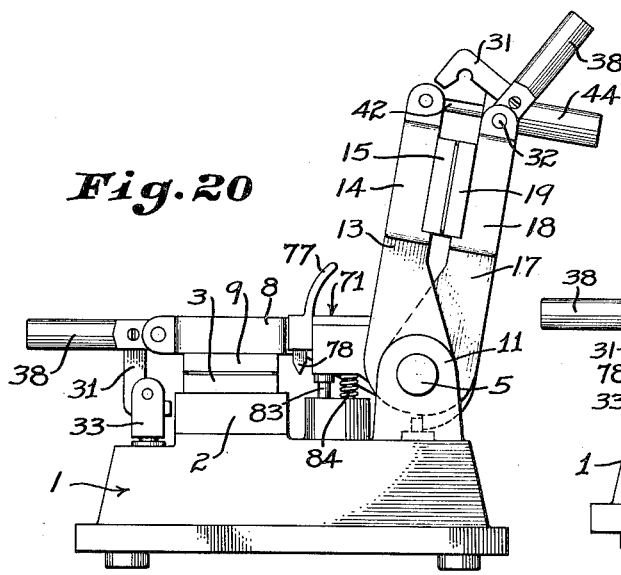
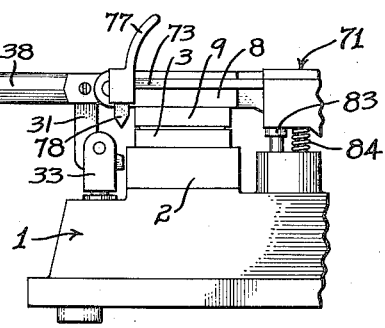
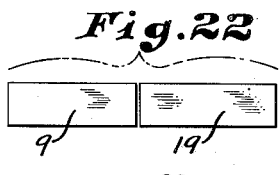
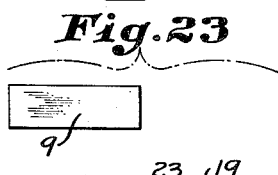
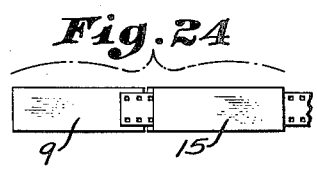
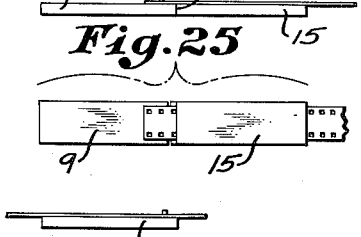
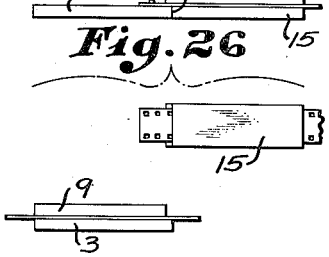
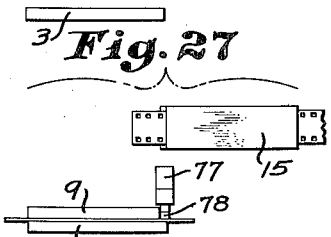
Inventor
Benjamin W. Hancock
Joseph B. Maier
By Lyon & Lyon
Attorneys Patented Mar. 6, 1951

2,544,082

UNITED STATES PATENT OFFICE 2,544,082

FILM SPLICING MACHINE

Benjamin W. Hancock and Joseph B. Maier, Pacoima, Calif., assignors to Maier-Hancock Corp., Pacoima, Calif., a corporation of California Application August 11, 1947, Serial No. 767,954

5 Claims. (Cl. 154—42.1)

Our invention relates to film splicing machines, more particularly, to machines for splicing motion picture film, and included in the objects of our invention are:

First, to provide a motion picture film splicer which is capable of rapid yet dependable operation to produce a full strength spliced and trimmed connection between strips of film.

Second, to provide a motion picture film splicing machine which incorporates a novel emulsion scraping device so arranged as to remove the emulsion from the overlapping portions of the film strips to be joined, and provided with means to regulate the depth of the scraping cut so as to insure removal of the emulsion without damaging or weakening the film strip.

Third, to provide a motion picture film splicing machine which employs a novelly arranged trimming means which trims simultaneously the free ends of both parts of the film to be joined, the trimming means being incorporated in the confronting portions of clamp units employed to hold the film in proper relation, and one of the clamp units having a cam means for shifting the unit so that the trimming means is rendered inoperative except when the clamp units are moved into film splicing relation.

Fourth, to provide a motion picture film splicer which is arranged to handle film of different sizes, for example, 16 mm. and 35 mm. film.

With the above and other objects in view, reference is directed to the accompanying drawings in which:

Figure 3 is a transverse sectional view thereof taken through 3—3 of Figure 1.

Figure 4 is a fragmentary sectional view through 4—4 of Figure 1, showing the latch means which joins the jaws of the movable clamp unit.

Figure 5 is a fragmentary view, partially in section, of said latch and adjacent portions of the clamp unit.

Figure 6 is a fragmentary sectional view through 6—6 of Figure 3, showing one of the hold-down latching units.

Figure 7 is a fragmentary sectional view through 7—7 of Figure 1, illustrating the journal means for the clamp units and the emulsion scraper.

Figure 8 is a fragmentary sectional view thereof through 8—8 of Figure 7, showing the manner in which cam means are employed to effect lateral shifting of one of the clamp units.

Figure 9 is a perspective view showing the mating portions of the co-acting cam means.

Figure 10 is a fragmentary sectional view through 10—10 of Figure 1, showing particularly the emulsion scraper.

Figure 11 is a fragmentary sectional view through 11—11 of Figure 3, with the lower jaws of the two clamping units shown in elevation.

Figure 12 is a sectional view through 12—12 of Figure 11, showing the construction of the clamping jaws and their cooperating film trimming shears.

Figure 13 is a fragmentary sectional view through 13—13 of Figure 12, showing the manner in which the upper jaws are leveled with respect to the lower jaws of the clamping units.

Figure 14 is a sectional view through 14—14 of Figure 12, showing the movable guide means for one size of film to be spliced in the machine.

Figure 15 is a fragmentary sectional view through 15—15 of Figure 14.

Figure 16 is a fragmentary sectional view through 16—16 of Figure 12, showing the retractable registering pins, portions of the clamp unit being shown in section.

Figure 17 is a fragmentary sectional view thereof through 17—17 of Figure 16.

Figure 18 is a fragmentary sectional view through 18—18 of Figure 10, showing the emulsion scraper.

Figure 19 is an enlarged fragmentary view of the latching finger employed in the hold-down latches.

Figure 20 is an end elevational view of the film splicing machine with the movable clamp unit in its raised position.

Figure 21 is a fragmentary end view similar to Figure 20, showing the operation of the emulsion scraper.

Figure 1:
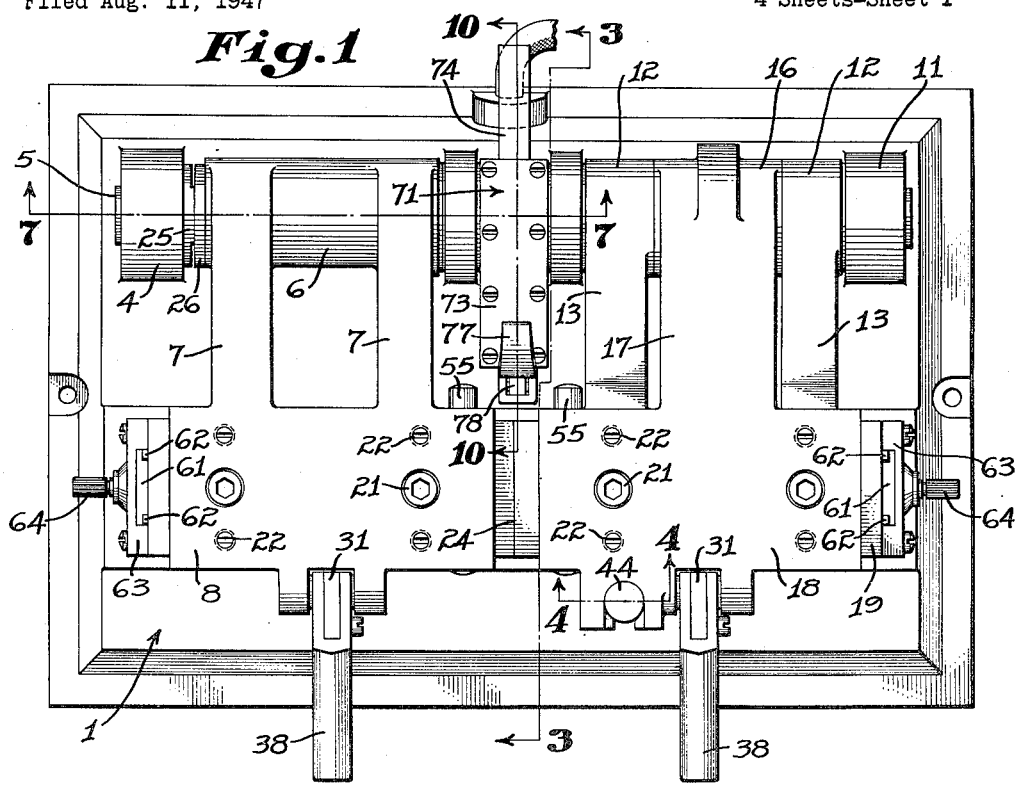
Figure 1 is a plan view of our film splicing machine.
Figure 2:
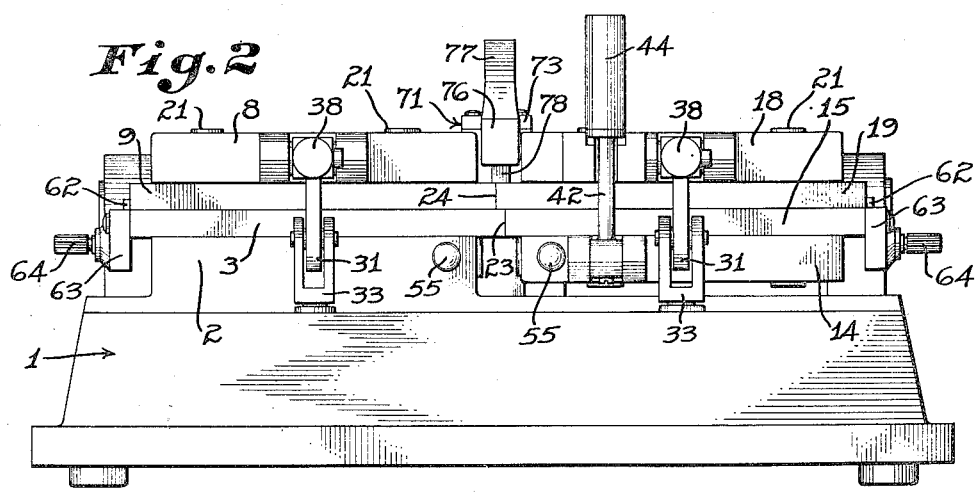
Figure 2 is a front elevational view thereof.

Figures 22 to 28 inclusive are diagrammatical views showing the steps employed in splicing a film by the use of our machine.

Our motion picture splicing machine is mounted on a raised base 1 of rectangular form. Mounted over the base 1 is a pair of axially related clamp units. The first clamp unit includes a table 2 which is in the form of an integral boss extending upwardly from the normal level of the base 1. Secured to the table 2 is a fixed clamp plate 3 having a flat upper surface. Rearwardly of the table 2 the base 1 is provided with a pair of journaled bosses 4 through which extends a pin 5. A sleeve 6 is journaled on the pin 5 and is provided with parallel arms 7 which extend over the table 2 and terminate in a clamp head 8. Secured to the underside of the clamp head 8 is a clamp plate 9 which registers with the fixed clamp plate 3.

The base 1 is provided with an additional pair of journaled bosses 11 in alignment with the bosses 4 and arranged to receive a continuation of the pin 5. Journaled between the bosses 11 is a pair of bearings 12 from which extend arms 13 terminating in a lower clamp head 14 adapted to occupy a position at one side of the table 2. The lower clamp head 14 receives a lower clamp plate 15 which is adapted to align with the fixed clamp plate 3.

Between the bearings 12 there is independently journaled a bearing 16 from which extends an arm 17 terminating in an upper clamp head 18. Fastened to the upper clamp 18 is an upper clamp plate 19 which registers with the lower clamp plate 15 and is therefore in axial alignment with the clamp plate 9 of the adjacent clamp unit. In order that the lower clamp plate 15 may be adjusted so that its upper surface is coplanar with the surface of the fixed clamp plate 3 there is provided an adjustable stop 20 extending upwardly through the base 1.

It is essential as will be brought out hereinafter that the mating clamp plates be in parallel relation when clamping a motion picture film. This is accomplished by first machining flat the upper surface of the table 2 and securing the fixed clamp plate 3 thereto by holding screws 21. The upper clamp plate 9 is also secured to its clamp head 8 by screws 21 and is leveled relative to the fixed clamp plate 3 by means of four set screws 22. Similarly, the clamping face of the lower clamp plate 15 is brought into proper coplanar relation with the fixed clamp plate 3 by means of set screws 22 and is held by holding screws 21. The same arrangement is employed to secure the upper clamp plate 19 to the upper clamp head 18.

The confronting ends of the fixed clamp plate 3 and lower clamp plate 15 form the cooperating elements of a lower trimming shear 23. Similarly the confronting faces of the clamp plate 9 and upper clamp plate 19 form an upper trimming shear 24 which is offset axially from the lower trimming shear in the direction of the clamp plate 9 a distance equal to the intended overlap of the film strips to be spliced.

The clamp unit which comprises the clamp plates 15 and 19 may be moved bodily to an upright position such as shown in Figure 20 clear of the other clamp unit comprising plates 3 and 9, or the upper clamp plate 15 may be moved individually in the manner of the clamp plate 9. When the clamp plates are in their raised positions it is essential that the trimming shear 24 be inoperative. This is accomplished by providing cooperating cam plates 25 and 26 between the sleeve 6 and adjacent journaled bosses. The cam plates are secured by pins 27 and their confronting faces are so formed that as the clamp plate 9 moves into its horizontal position the sleeve 6 is shifted to the right as viewed in Figure 1 a predetermined distance to place the shearing face of the clamp plate in proper relation to the corresponding shearing face of the clamp plate 19. Located within a counterbore provided within the sleeve 6 as shown in Figure 7 is a spring 28 which shifts the sleeve 6 to the left as viewed in Figure 1 so as to space the elements of the upper trimming shear 24 in inoperative relation when the clamp plates are in their raised position.

The clamp plate 9 is held against the fixed clamp plate 3 by the holddown latch. A similar holddown latch is employed to hold the clamp plates 15 and 19 against the stop 20. The holddown latches are shown best in Figures 2, 3, 6, 19 and 20. Each holddown latch includes a latch lever 31 journaled on a pin 32 between a pair of journal lugs extending forwardly from the corresponding head 8 or 18. The latch lever depends from the journal pin 32 terminating in a rearwardly directed hook adapted to engage a cross pin extending horizontally between the arms of a yoke 33. The yoke 33 is mounted on the end of a vertical stem 34 which extends downwardly through a bushing 35 mounted in the base 1 and protruding into the recessed underside thereof as shown best in Figures 3 and 6. The extremity of the stem 35 is provided with a cross pin 36 and a spring 37 surrounds the bushing 35 to bear downwardly on the cross pin. A handle 38 extends in a normally horizontal position forwardly from the latch lever 31.

The clamp plates 15 and 19 are held together by a clamping latch so that they may be pivoted in unison about the journal pin 5. The clamping latch is shown best in Figures 2, 4 and 5. A pair of journal lugs extending from the lower clamp head 14 supports a pin 41 which journals the lower end of a stem 42 adapted to extend upwardly through a yoke 43 in the form of a slotted lug integrally with the upper clamp head 18. The upper end of the stem 42 is covered by a handle cap 44 slidable on the stem by means of a collar 45. Between the collar 45 and the extremity of the stem, which is provided with lock nuts 46, is a spring 47 tending to urge the handle cap 44 downwardly, thereby to bear against the upper face of the yoke 43. This upper face is cammed to facilitate latching movement of the handle cap 44.

Strips of film are located on the fixed clamp plate 3 and lower clamp plate 15 by registering means. Such means includes a pair of pins 51 set in the fixed clamp plate 3 adjacent the upper trimming shear 24 as shown best in Figure 11. The registering pins 51 are shaped to fit snugly into the drive or sprocket slots provided along the margins of a conventional motion picture film. As will be brought out hereinafter the pair of pins in the fixed clamp plate 3 serve to position both strips of film which are to be spliced. Clearance holes or sockets which receive the pins 51 are provided in the clamp plate 9.

The pins 51 are preferably positioned so as to fit 35 mm. film. In order to handle film of lesser width or film having only one row of drive slots, retractable registering means are employed. This is shown best in Figures 11, 12, 14 and 16.

The retractable registering means includes a pair of pins 53 mounted respectively in the fixed plate 3 and lower clamp plate 15 adjacent the trimming shears. One of these pins may be located between the fixed registering pins 51. Each retractable registering pin 53 is guided in a vertical socket provided in the clamp plate and in the table 2 or lower clamp head 14, as the case may be. The pins 53 are provided with lateral stems 54 which extend into vertical slots provided in these members. These members; that is, the table 2 and lower clamp head 14, are provided with horizontal bores traversing the stems 54. Fitted in each bore is a shifting bar 55 and an angularly directed cam slot 56 adapted when the shifting bar is reciprocated to raise and lower the stem 54 thereby to raise and lower the corresponding registering pin. The extremities of each shifting bar 55 protrude so that they may be engaged for movement in either direction. A detent in the form of a ball 57 backed by a spring 58 and adapted to ride in either of a pair of grooves 59 formed in the shifting bar is employed to hold the bars in two positions; one in which the retractable registering pin 53 is below the surface of the clamp plate and the other in which the pin protrudes. Accommodation sockets 59 are provided in the clamp plates 9 and 19.

In addition to the retractable registering pins 53 the retractable registering means includes a pair of guide plates 61 located at the remote extremities of the clamp plates 3 and 15. Each guide plate is provided with a pair of prongs 62 spaced apart the width of the film thereby handled; that is, the prongs do not fit in the sprocket holes of the film but bear against the edges of the film. The guide plates 61 are held by retainer plates 63 which journal stems 64, the outer extremities of which form handles. The inner ends of the stems 64 are provided with eccentrics 65 which rotate in recesses provided in the guide plates 61 in a manner to raise and lower the guide plates when the stems 64 are rotated.

The end of the fixed clamp plate 3 protrudes beyond the clamp plate 9 to form a narrow shelf in the region between the shears 23 and 24 exposing a strip of film clamped between the members 3 and 9. In the operation of the machine as will be brought out hereinafter the film is placed emulsion side up and it is necessary, in order to splice the film, that the emulsion be removed without damaging the film itself. This is accomplished by an emulsion scraper. The emulsion scraper includes a lever arm 71 journaled on the pin 5 between the adjacent bosses 4 and 11. The lever arm is provided with a longitudinal channel 72 which receives a cover plate 73 and provides a guide for a slide bar 74. Inasmuch as the slide bar should be relatively free from play, a shimming plate 75 backed by suitable set screws is mounted along one side of the channel. One end of the slide bar is provided with a head 76 having an upwardly directed and curved handle 77. The head 76 is provided with a vertical slot which receives a scraper bar 78. The scraper bar is pointed at its lower end and preferably provided with a cemented carbide tip. Set screws 79 extend laterally into the head 76 and are so arranged that not only the vertical location but also the lateral adjustment of the scraper bar may be obtained.

The slide bar 74 is limited in its movement by a pin 80 and a stop bar 81 located respectively on the slide bar and traversing the channel below the slide bar. The slide bar is retracted by means of a spring 82.

In order that the cutting end of the scraper bar 78 will occupy a proper elevation relative to a film overlying the fixed clamp plate 3 the lever arm 71 engages an adjustable stop 83 shown best in Figure 3. The lever is urged away from this stop by means of a tilting spring 84. A stop 85 comprising a lug at the underside of the lever arm 71 and a pin protruding from the base 1 limits the upper tilting movement of the scraper unit.

Operation of our film splicing machine is best illustrated by reference to the diagrammatic views of Figures 22-28. Initially the clamp plates 9 and 19 are raised, the right hand section of film as viewed from the front of the machine, that is, the position as viewed in Figure 22, is placed over the lower clamp plate 15 and protrudes over the fixed clamp plate 3. The appropriate slots in the film are fitted over the fixed pins 51. The upper clamp plate 19 is brought down as shown in Figure 23 and the right hand section of the film is clamped by use of the latch involving stem 42 and handle 44. The clamped right section of film is then raised as shown in Figure 24; the left hand section of film is then placed over the fixed plate 3, the appropriate sprocket holes being fitted over the fixed registering pins 51 as shown in Figure 25. The left hand section is then clamped by means of the clamp plate 9, it being noted that by reason of the cam plates 25 and 26 the clamp plate 9 is spaced axially from the clamp plate 19 when in its upper position so that it may be moved downwardly past the protruding end of the right hand section of film without cutting or damaging the film. The left hand section of film is now in the condition shown in Figure 26.

The scraper unit is operated by pressing downwardly on the lever arm 71 and drawing the slide bar 74 forwardly so as to move the scraper bar 78 across the portion of the film protruding beyond the clamp plate 9 and overlying the clamp plate 3 as shown in Figure 27. The adjustment of the stop 83 is such that the scraper can only cut deep enough to remove the emulsion; that is, cannot cut deep enough to appreciably weaken the film itself. After the film has been scraped, a cement or solvent is applied to the exposed scraped portion. The clamp plates 15 and 19 are then moved downwardly causing the lower and upper trimming shears 23 and 24 to sever the excess portions of the film sections as shown in Figure 28. The clamp plates 15 and 19 are latched by means of the hold down latch involving lever 31 and remaining in this position until the solvent or cement has hardened sufficiently.

The time required to effect a bond between the two film sections may be greatly reduced by heating the fixed clamp plate 3. This is accomplished by a heating unit 86 mounted within the table 2 as shown in Figure 12. The heat is preferably regulated by a thermostat so that the plate 3 is not heated sufficiently to damage the emulsion of the film.

Having fully described our invention, it is to be understood that we do not wish to be limited to the details herein set forth, but our invention is of the full scope of the appended claims.

We claim:

1. A film splicing machine, comprising: two sets of clamping plates adapted to receive and secure strips of a film to be spliced, the confronting ends of said plates forming the elements, a pair of axially displaced trimming shears; means for moving one set of plates bodily clear of the other, to expose a section of said film between the cutting planes of said shears; a lever arm pivotable about a horizontal axis; an extension slide carried thereby; a scraper mounted on said extension slide, said lever movable about its horizontal axis to a position for transverse movement of said scraper across said exposed film section; and an adjustable stop engaged by said lever for regulating the level of said scraper and the depth of cut made thereby on said exposed film section.

2. A film splicing machine, comprising: a base structure including horizontal journal means, and a fixed clamping plate mounted forwardly of said journal means; a clamping plate carried by said journal means and movable between a lowered position coacting with said fixed plate and a raised position; said fixed clamping plate protruding axially beyond said movable clamping plate and forming a transverse shelf adapted to be covered by a strip of film secured between said clamping plates; an emulsion scraper including a lever carried by said journal means pivotal about a horizontal axis, an extensible scraper arm carried by said lever and having a scraping tool, said tool adapted to be drawn across said shelf to scrape the emulsion on a film covering said shelf; and means for regulating the movement of said lever to predetermine the depth of scraping cut made by said tool.

3. A film splicing machine, comprising: a base structure including horizontal journal means, and a fixed clamping plate mounted forwardly of said journal means; a clamping plate carried by said journal means and movable between a lowered position coacting with said fixed plate and a raised position; said fixed clamping plate protruding axially beyond said movable clamping plate and forming a transverse shelf adapted to be covered by a strip of film secured between said clamping plates; an emulsion scraper including a lever carried by said journal means pivotal about a horizontal axis, an extensible scraper arm carried by said lever and having a scraping tool, said tool adapted to be drawn across said shelf to scrape the emulsion on a film covering said shelf; means for regulating the movement of said lever to predetermine the depth of scraping cut made by said tool; a clamp unit including a pair of coacting clamping plates mounted on said journal means for movement between a lowered position in end abutting relation with said fixed and movable clamping plates and a raised position; and a pair of trimming shears incorporating the abutting extremities of said clamping plates for shearing overlying film strips along the margins of the path scraped by said scraping tool.

4. In a film splicing machine wherein a pair of axially aligned clamping units are adapted to receive strips of film to be spliced and wherein the abutting ends of the clamping units form axially displaced clamping shears, and wherein one of said clamping units is movable to expose a portion of film in the region between the cutting planes of said shears; a film scraping means, comprising: a lever member pivotable about a horizontal axis; a slide arm carried thereby; a scraping tool carried by said slide arm for scraping movement across the exposed portion of film; means for limiting movement of said lever arm to control the position of said scraping tool to predetermine the depth of scraping cut and yieldable means normally holding said scraping tool in an elevated position.

5. In a film splicing machine wherein a pair of axially aligned clamping units are adapted to receive strips of film to be spliced and wherein the abutting ends of the clamping units form axially displaced clamping shears, and wherein one of said clamping units is movable to expose a portion of film in the region between the cutting planes of said shears; a film scraping means, comprising: a lever member pivotable about a horizontal axis; a slide arm carried thereby; a scraping tool carried by said slide arm for scraping movement across the exposed portion of film; means for limiting movement of said lever arm to control the position of said scraping tool to predetermine the depth of scraping cut; and cooperating yieldable means associated with said slide and with said lever to hold said scraping tool in a normally retracted and raised position.

BENJAMIN W. HANCOCK.
JOSEPH B. MAIER.

REFERENCES CITED

The following references are of record in the file of this patent:

UNITED STATES PATENTS

| Number | Name | Date |
|---|---|---|
| 1,007,034 | Kline | Oct. 24, 1911 |
| 1,195,175 | Bendheim | Aug. 22, 1916 |
| 1,209,339 | Schippers et al. | Dec. 19, 1916 |
| 1,254,911 | Howell | Jan. 29, 1918 |
| 1,275,431 | Howell | Aug. 13, 1918 |
| 1,328,056 | Rosenfeld | Jan. 13, 1920 |
| 1,413,269 | Griswold | Apr. 18, 1922 |
| 1,464,265 | Griswold | Aug. 7, 1923 |
| 1,471,864 | Sentou et al. | Oct. 23, 1923 |
| 1,523,056 | Czako | Jan. 13, 1925 |
| 1,981,332 | Rohrdanz | Nov. 20, 1934 |
| 2,394,317 | Matson | Feb. 5, 1946 |